May 13, 1924.
J. C. WILKIE
1,494,089
CRANK SHAFT SUPPORTING MECHANISM FOR LATHES
Filed June 10, 1922     3 Sheets-Sheet 1
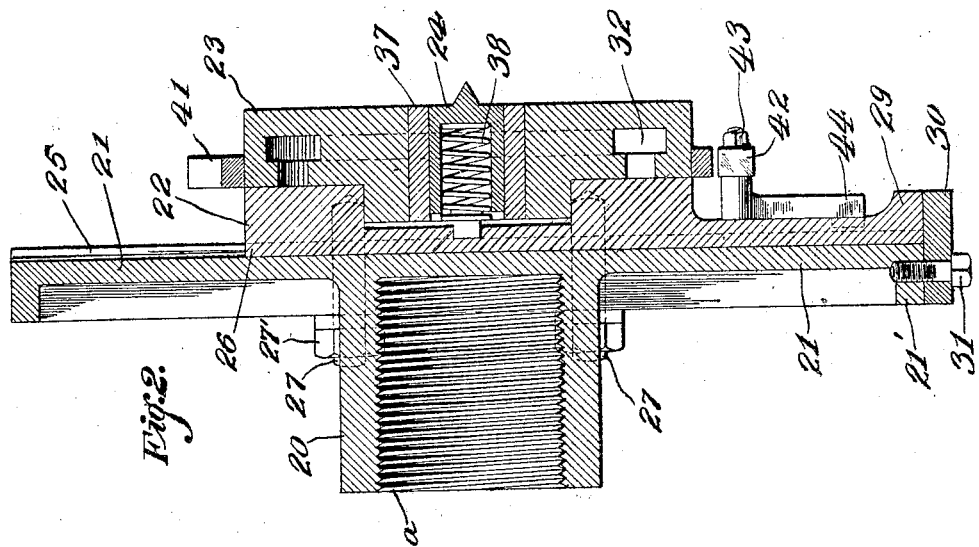
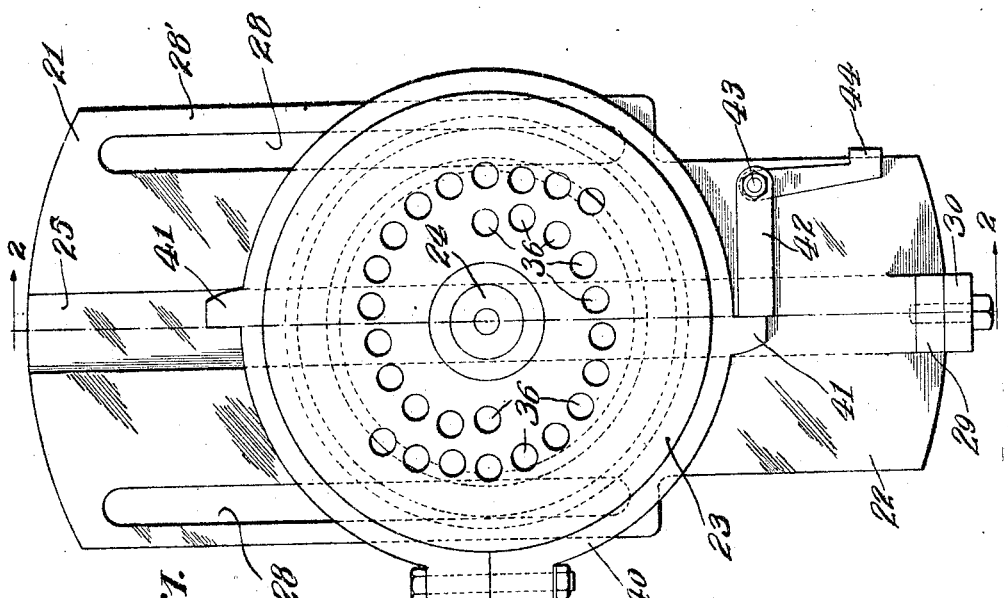
Inventor
Julius C. Wilkie
By Mason, Fenwick & Lawrence
Attorneys May 13, 1924.
J. C. WILKIE
1,494,089
CRANK SHAFT SUPPORTING MECHANISM FOR LATHES
Filed June 10, 1922    3 Sheets-Sheet 2
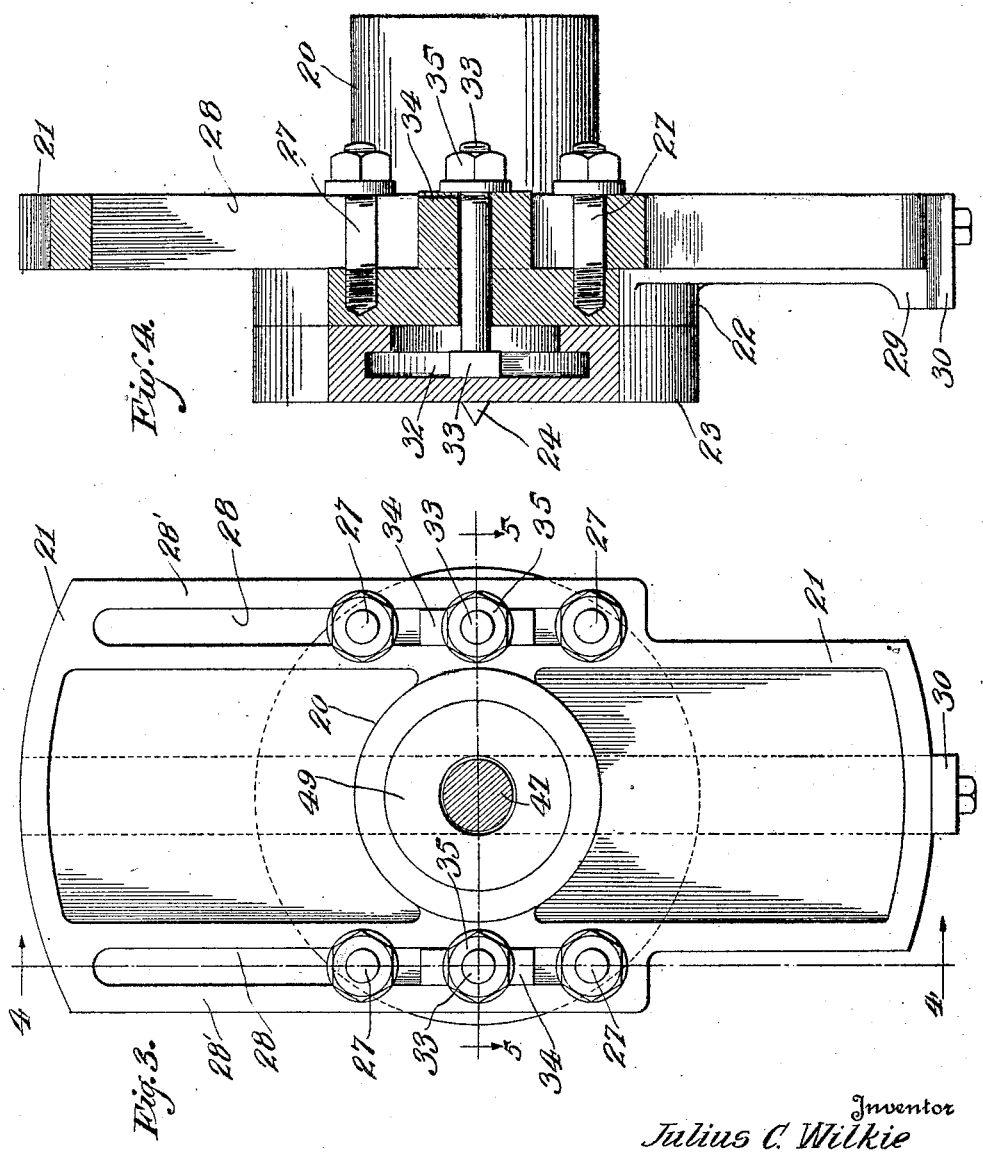
Inventor
Julius C. Wilkie
By Mason, Fenwick & Lawrence
Attorneys

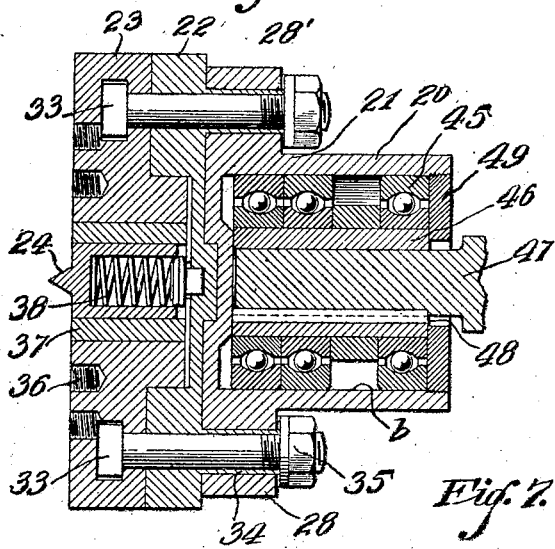
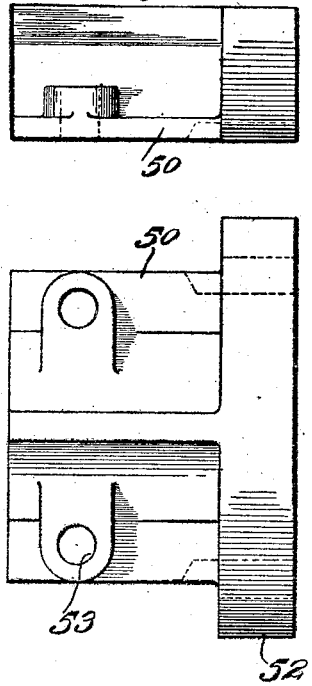
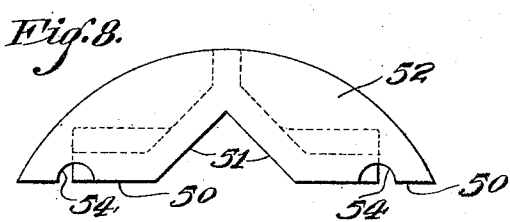
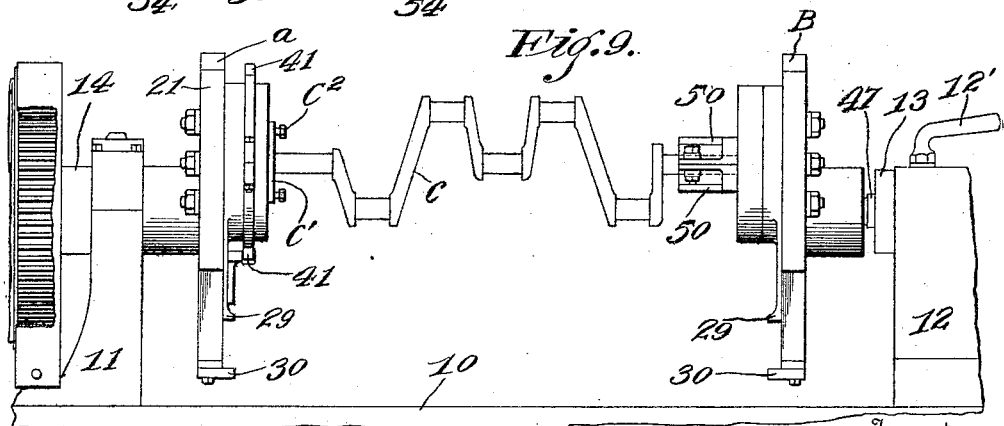

Patented May 13, 1924.

1,494,089

UNITED STATES PATENT OFFICE.

JULIUS C. WILKIE, OF WINONA, MINNESOTA.

CRANK-SHAFT-SUPPORTING MECHANISM FOR LATHES.

Application filed June 10, 1922. Serial No. 567,332.

*To all whom it may concern:*

Be it known that I, JULIUS C. WILKIE, a citizen of the United States, residing at Winona, in the county of Winona and State of Minnesota, have invented certain new and useful Improvements in Crank-Shaft-Supporting Mechanisms for Lathes; and I do hereby declare the following to be a full, clear, and exact description of the invention, such as will enable others skilled in the art to which it appertains to make and use the same.

This invention relates broadly to machine tools but more specifically to attachments for lathes or grinding machines which will enable proper placement or securement of crank-shafts in such tools. It is an object of the invention to provide an attachment for engine lathes whereby crank-shafts can be held in a manner to permit truing of the bearings thereof as by turning or grinding.

More particularly the invention consists in the provision of mechanism which may be attached to the live and dead spindles of a lathe for supporting a crank-shaft therebetween. The mechanism embodies means for holding the crank in offset position and for adjusting the shaft in such manner as to insure that the various crank bearings as well as journal bearings thereof shall be properly spaced.

The above and other novel features of the invention will appear from the detailed description thereof taken in connection with the three sheets of drawings forming part of this specification, reference being had to the appended claims for the scope of the invention.

In the drawings,

Figure 1 is a front elevation of the improved attachment showing the same as provided with a rotatable face plate;

Fig. 2 is a section on line 2—2 of Fig. 1;

Fig. 3 is a rear elevation of the attachment showing the hub part thereof as being provided with a false spindle for securing the attachment in the tail stock of the lathe;

Fig. 4 is a section on line 4—4 of Fig. 3;

Fig. 5 is a section on line 5—5 of Fig. 3;

Figs. 6, 7 and 8 are side, plan and front elevations, respectively, of clamping members used in connection with the crank-shaft at the tail-stock end of the lathe, and Fig. 9 is a diagrammatic view showing the application of the invention.

Referring first to Figure 9, 10 indicates the bed of an engine lathe, 11 the head stock thereof, 12 the tail stock, 13 the dead or slidable spindle, 12' the means for clamping said spindle against axial displacement, and 14 the live spindle. A and B represent the attachment at the live and dead spindles respectively, of the lathe and C a shaft held by such attachments.

Both live and dead spindle attachments are substantially the same, with the exception that the attachment designed for the live spindle has a threaded hub to be screwed onto the spindle while the attachment for the dead spindle has bearings in the hub, there being a false center or spindle in connection with said bearings whereby the attachment can turn about said center.

Reference character 20 indicates a hub projecting from the back of the face plate 21; 22 is a slide or carriage mounted on the front face of the face plate; 23 is a disk turnably seated on the slide, and 24 is an axially movable center in the disk 23.

The carriage or slide 22 is confined to a right line movement on the face plate by means of a tongue and groove connection therebetween, the said plate having a groove 25 and the slide having a tongue 26 extending thereinto. The slide is adjustably held in different positions on the face plate by suitable clamping means as studs 27 which project from the back face of the slide 22, the studs projecting through slots 28 parallelly disposed at opposite side edges of the face plate 21, which as shown, is generally rectangular in form, 28' indicating the outside walls of said slots. Nuts 27' on the terminals of the studs 27 serve to clamp the slide to the face plate as will be readily understood. It will be observed that the slots do not extend the full length of the face plate. This is for the reason that the slide need only move in one direction from its central location on the face plate as will presently appear.

The slide 22 is provided with a wing-like extension overlying the face plate 21 and which terminates in an abutment 29. The face plate 21 has a peripheral flange 21' and secured to the edge of said plate is a stop member 30 against which the abutment 29 is adapted to engage, the stop being secured to the plate in any suitable manner as by a set screw 31 passing into the flange 21'. When the slide 22 is in abutting relation with the stop 30 the center 24 in the disk 23 is aligned with the axis of the hub 20.

As already indicated the disk 23 is rotatably mounted on the slide 22. Means for locking the disk against rotation includes a T-shaped slot 32 in the disk and T-shaped bolts 33 cooperating with said slot. The heads of these bolts are seated in said slot, said bolts passing through openings in the slide and projecting through the slots 28. The disk could be clamped against rotation by nuts 35 threaded on the terminals of said bolts and engaging with the back of the face plate as will now be readily understood. This, however, would necessitate loosening of the nuts every time it was necessary to adjust the slide on the face plate. In order, therefore, to obviate this objection, I prefer to provide block-like extensions 34 which project from the back of the slide through said slots 28, these blocks extending somewhat beyond the back face of the face plate so as to elevate the washer and nut 35 from the face plate as will be understood. These blocks 34 may or may not be integral with the slide 22.

The face of the disk 23 is provided with a series of screw-thread holes 36 to facilitate the securement of the crank-shaft to the disk. This feature will be further referred to.

The center 24 as already indicated, is movably mounted in the disk 23. A suitable bearing 37 is provided for the center 24. The center 24 is bored out to receive a spring 38 which re-acts against the bottom of the slide 22, the spring serving as a cushion to yieldingly hold the center against the work, such as the crank-shaft.

In order to facilitate the turning of the disk 23 through a given number of degrees, a stop mechanism has been provided. In the present instance, this stop mechanism takes the form of a split ring 40 which may be clamped about the periphery of the disk as shown, and projecting from this ring are a plurality of lugs 41. In the present instance, only two such lugs are shown, but any suitable number of such lugs may be provided, depending upon the number of degrees that is desired to turn the disk at any given turning. Mounted on the slide 22 is an elbow lever 42 which is suitably pivoted as at 43 at one side of the slide, and depending from one arm of the lever is a stop finger 44 which engages with the side of the slide 22 when the lever is in position to engage with a lug 41. The stop lugs 41 are preferably rounded on their backs so as to swing the lever aside when rotated in clockwise direction as viewed in Fig. 1. It will now be understood that when it is desired to rotate the disk, it is first necessary to release the clamping members 35 on the bolts 33 after which the disk can be rotated as desired or through any number of given degrees, depending upon the number of stop lugs 41 employed in connection with the disk.

It is not necessary that the attachment at the tail stock be provided with a stop-locating ring 40 inasmuch as one such ring at the head attachment will be found sufficient as will be readily understood by those skilled in the art.

When the attachment is to be used in connection with the live spindle the hub 20 thereof will be internally threaded as at $a$. When, however, it is to be used at the tailstock end of the lathe, the hub is bored out as at $b$ to receive ball bearings 45, it being understood that the tail stock attachment is to rotate with the head stock attachment. The ball bearings include a sleeve 46 which is adapted to receive a false center or spindle 47. This center is adapted to be inserted in the dead spindle 13 at the tail stock within which it is frictionally held in the usual manner. In order to positively lock the center 47 to the sleeve 46, I prefer to provide a spline or key 48 between said members. The mouth of the hub 20 in the form under consideration, is closed by a plate 49 preferably screw-threaded therein. The arrangement shown effectually prevents dust and foreign material from entering the bearings.

As already indicated the tail stock attachment is designed to be rotated with the head stock attachment when a crank-shaft is secured therebetween. One end of the crank-shaft is usually provided with a flange disk $C^1$, while the other end is not so provided. It is, therefore, a simple matter to secure said flange to the face of the disk 23 inasmuch as it is merely necessary to pass screw bolts $C^2$ through the flange into the screw holes 36 already provided in the disk. A plurality of such screw holes are provided so as to accommodate flanges of different diameters. It will be understood that the centers 24 are entered into the ends of the crank-shaft. Inasmuch as the other end of the crank-shaft is not commonly provided with a flange, it becomes necessary to provide a suitable means for clamping the crank-shaft terminal to the tail stock attachment. This means preferably takes the form of two separate clamp members 50, each having a V-shaped groove 51 therein in which the shaft terminal is adapted to be seated, and each being provided with an annular flange 52. The clamp members are provided with bore holes 53 through which suitable clamping bolts may be passed for securing said clamps on the shaft. In order to enable the clamp members to be secured to the disk 23 suitable holes 54 are provided in the flange 52, it being understood that suitable bolts or abutments for the flange will be screwed into the screw holes 36 provided in the disk 23 for that purpose.

The mode of operation of the device may now be briefly described. The attachment is mounted on the live spindle in place of the usual face plate or chuck and the slide and disk is so positioned on the face plate of the attachment that the center 24 thereof will be axially aligned with the spindle of the lathe. The attachment at the tail end of the lathe will also have its center similarly aligned. A crank-shaft is then mounted on the centers 24 and the slide 22 moved away from the center of the lathe spindles the required distance to align the crank-pin portion of the shaft with such center. It is, of course, understood that the shaft will have been locked against rotation with respect to the disk in any suitable manner or by the means indicated. After the slide 22 has been moved corresponding to the throw of the crank, the slide is clamped to the face plate by the clamping means 27. Thereafter in order to grind or turn the other crank pins of the same shaft, it is merely necessary to rotate the disk the required number of degrees to bring such other crank pins into alignment with the spindles of the machine.

As already stated the centers are spring cushioned. This arrangement insures that excess pressure will not be put upon the shaft when it is first set up in the lathe. The usual method of placing the crank-shaft in the lathe would be to bring the head stock and tail stock centers close enough to each other to allow the crank-shaft to be placed on the cushioned centers by slight adjustment of the tail stock spindle. The next step is to bring the flange C' of the shaft in face to face relation with the face plates and secure the same thereto by means of securing bolts C² or other analogous devices. This bringing of the flange C' into contact with the face plate is made against the resistance of the center cushion spring 38. The other end of the shaft is also secured to the tail stock face plate by means of the clamp which has been placed upon the journal of the crank-shaft. Inasmuch as the other end of the crank-shaft is in fixed position it is clear that the tail stock face plate must be brought into abutting relation with the face of the clamp. This may, of course, be accomplished by moving the face plate into such engagement by bodily moving the tail stock spindle or the face plate may be brought into such engagement by shifting the same bodily on the false center 47, it being recalled that the false center 47 is slidably mounted in the hub of the tail stock attachment. In bringing the tail stock face plate into engagement with the face of the attached clamp, the center 24 will yield to permit such placement.

It will now be seen that the crank-shaft is mounted between the head and tail stock spindles of the lathe in a manner to avoid distorting the crank-shaft due to pressure exerted on its ends. It will further be noted that one end of the crank-shaft, viz, the tail stock end is slidably mounted with respect to the tail stock spindle by reason of the fact that the tail stock face plate is slidably mounted on the false center 47. This slidability of one end of the crank-shaft permits the shaft to expand or contract according to changes of temperature and insures that there shall be no undue end pressure on the crank-shaft tending to distort the same. It will, of course, be understood that the tail stock attachment is so disposed on the false center or spindle 47 after the shaft has been mounted between the face plates, that sliding movement of the tail stock attachment can be had on the member 47.

From the above description, it will now be seen that I have provided an attachment which can be readily applied to existing machine tools such as lathes or grinders and that the attachment is such that after the slide 22 has once been adjusted to allow for the throw of the cranks that the other cranks of the shaft can readily be brought into axial alignment with the spindle of the lathe.

While I have described the invention with considerable particularity of detail, I desire it to be distinctly understood that I intend no limitations except as may be defined in the appended claims.

What I claim is:

1. In combination, a face plate, a slide mounted thereon, a turnable disk mounted on said slide, radially projecting lugs carried by said disk, and a movable stop member carried by said slide against which selective lugs may engage.

2. In combination, a face plate, a slide mounted thereon, a turnable disk mounted on said slide, a split band removably secured on the disk, radial lugs on the band, and means on the slide for selective engagement with said lugs.

3. In combination, a face plate having a pair of laterally disposed slots at its sides and having a groove intermediate said slots, a slide mounted on the face plate and having a tongue seated in said groove, clamping means extending from said slide through said slots, a disk rotatably mounted on the slide and having a T-shaped groove in its under face, means for clamping said disk to said slide including T-head bolts seated in said last-mentioned groove and projecting through said slots, a cushion center carried by said disk, a hub on the back of the face plate, and an abutment carried by said plate for axially aligning the center and hub.

4. In combination, a face plate having a pair of laterally disposed slots at its sides and having a groove intermediate said slots, a slide mounted on the face plate and having a tongue seated in said groove, clamping means extending from said slide through said slots, a disk rotatably mounted on the slide and having a T-shaped groove in its under face, means for clamping said disk to said slide including T-head bolts seated in said last-mentioned groove and projecting through said slots, a cushion center carried by said disk, a hub on the back of the face plate, an abutment carried by said plate for axially aligning the center and hub, and means carried by the slide for limiting the degree of turning movement of the disk.

5. The combination with the head and tail stock spindles of a lathe, of a face plate carried by the tail stock spindle, means interposed between said plate and tail stock spindle permitting bodily movement of the face plate axially of said tail stock spindle, and a center carried by said plate, said center being cushioned for movement parallelly of the axis of said spindle, and displaceable transversely thereof.

6. The combination with the head and tail stock centers of a lathe, of centers carried by said spindles, means for displacing said centers transversely of said spindles, a spring cushion for the center at the tail stock spindle, and means permitting bodily displacement of said tail stock spindle axially of the latter independently of the cushioned displacement of said center.

In testimony whereof I affix my signature.

JULIUS C. WILKIE.